US012662326B2

(12) United States Patent
Apolo Cando et al.

(10) Patent No.: US 12,662,326 B2
(45) Date of Patent: Jun. 23, 2026

(54) CONVEYOR BELT CONDITION MONITORING SYSTEM AND METHOD

(71) Applicant: CMTE DEVELOPMENT LIMITED, Pinjarra Hills (AU)

(72) Inventors: Jose David Apolo Cando, Pinjarra Hills (AU); Karsten Hoehn, Pinjarra Hills (AU)

(73) Assignee: CMTE DEVELOPMENT LIMITED, Pinjarra Hills (AU)

( * ) Notice: Subject to any disclaimer, the term of this patent is extended or adjusted under 35 U.S.C. 154(b) by 39 days.

(21) Appl. No.: 18/700,195

(22) PCT Filed: Oct. 11, 2022

(86) PCT No.: PCT/AU2022/051223
§ 371 (c)(1),
(2) Date: Apr. 10, 2024

(87) PCT Pub. No.: WO2023/060304
PCT Pub. Date: Apr. 20, 2023

(65) Prior Publication Data
US 2024/0417183 A1 Dec. 19, 2024

(30) Foreign Application Priority Data
Oct. 11, 2021 (AU) ................................ 2021903257

(51) Int. Cl.
B65G 43/02 (2006.01)
G06T 7/00 (2017.01)
G06V 20/52 (2022.01)

(52) U.S. Cl.
CPC ............ B65G 43/02 (2013.01); G06T 7/0004 (2013.01); G06V 20/52 (2022.01);
(Continued)

(58) Field of Classification Search
None
See application file for complete search history.

(56) References Cited

U.S. PATENT DOCUMENTS

| | | | | |
|---|---|---|---|---|
| 4,437,563 A | * | 3/1984 | Oriol | B65G 43/02 198/810.02 |
| 5,155,548 A | * | 10/1992 | Danver | G01P 15/18 367/149 |

(Continued)

FOREIGN PATENT DOCUMENTS

| | | | | |
|---|---|---|---|---|
| AU | 2020101168 A4 | * | 7/2020 | B65G 43/02 |
| WO | WO-2018/152575 A1 | | 8/2018 | |

OTHER PUBLICATIONS

International Search Report and Written Opinion, International Application No. PCT/AU2022/051223, mailed on Jan. 4, 2023.

*Primary Examiner* — Gene O Crawford
*Assistant Examiner* — Muhammad Awais
(74) *Attorney, Agent, or Firm* — MARSHALL, GERSTEIN & BORUN LLP

(57) ABSTRACT

A method of monitoring a conveyor belt state, the method including the steps of: (a) monitoring the acoustic emissions from a conveyor belt using an optical waveguide interrogator, the optical waveguide interrogator outputting a series of data bins representing the temporal evolution of the acoustic emissions received along the optical waveguide; and (b) utilizing the temporal evolution of the acoustic emissions of adjacent data bins to detect anomalies in the conveyor belt state.

9 Claims, 6 Drawing Sheets

(52) U.S. Cl.
  CPC ................... *B65G 2203/044* (2013.01); *G06T 2207/20061* (2013.01); *G06T 2207/30164* (2013.01)

(56)       References Cited

U.S. PATENT DOCUMENTS

| | | | | |
|---|---|---|---|---|
| 7,221,619 | B1* | 5/2007 | George | G01V 1/38 367/16 |
| 8,069,975 | B2* | 12/2011 | Wallace | B65G 43/02 198/810.02 |
| 8,618,929 | B2* | 12/2013 | Ganapathy | B65G 43/02 340/539.1 |
| 2012/0078534 | A1* | 3/2012 | Selker | G01K 11/32 702/33 |
| 2019/0130994 | A1* | 5/2019 | Ruderman | G16B 40/10 |
| 2020/0064226 | A1* | 2/2020 | Wilson | G01H 9/004 |

* cited by examiner

82

| -2.46 | -2.18 | -1.89 | -1.60 | -1.31 | -1.02 | -0.73 |
|---|---|---|---|---|---|---|
| -1.60 | -1.31 | -1.02 | -0.73 | -0.44 | -0.15 | 0.13 |
| -0.73 | -0.44 | -0.15 | 0.13 | 0.42 | 0.71 | 1.00 |
| 0.13 | 0.42 | 0.71 | 1.00 | 0.71 | 0.42 | 0.13 |
| 1.00 | 0.71 | 0.42 | 0.13 | -0.15 | -0.44 | -0.73 |
| 0.13 | -0.15 | -0.44 | -0.73 | -1.02 | -1.31 | -1.60 |
| -0.73 | -1.02 | -1.31 | -1.60 | -1.89 | -2.18 | -2.46 |

81

| -1.0 | -0.5 | 0.0 | 0.5 | 1.0 |
|---|---|---|---|---|
| -0.5 | 0.0 | 0.5 | 1.0 | 0.5 |
| 0.0 | 0.5 | 1.0 | 0.5 | 0.0 |
| 0.5 | 1.0 | 0.5 | 0.0 | -0.5 |
| 1.0 | 0.5 | 0.0 | -0.5 | -1.0 |

Figure 8: Example kernel for $S=1$, $N=5$ and $\theta = 45°$ (left); and $S=1$, $N=7$ and $\theta = 30°$ (right)

Fig. 8

CONVEYOR BELT CONDITION MONITORING SYSTEM AND METHOD

RELATED APPLICATION

The present disclosure claims benefit of priority to Australian Provisional Patent Application Number: 2021903257 filed Oct. 11, 2021, entitled: "Improvements in large scale industrial monitoring systems (Belt Rips)", the contents of which are incorporated herein by reference. In jurisdictions where incorporation by reference is not permitted, the applicant reserves the right to add any or the whole of the contents of the Application 2021903257 as an Appendix hereto, forming part of the specification.

FIELD OF THE INVENTION

The present invention provides for systems and methods for the large scale monitoring of machinery such as conveyor belts.

BACKGROUND OF THE INVENTION

Any discussion of the background art throughout the specification should in no way be considered as an admission that such art is widely known or forms part of common general knowledge in the field.

Recently, it has become possible to accurately monitor machinery and equipment on a large scale utilising optical fiber sensors attached to devices such as interrogator boxes, for the accurate determination of machine state.

For example, one form of monitoring system is for the monitoring of industrial and mining conveyor belts.

A suitable system for monitoring is disclosed in PCT application PCT/AU2018/050144 entitled: "Optical Acoustic Sensing System and Method", filed Feb. 22, 2018. The aforementioned PCT application discloses a system for monitoring a conveyor belt utilising an optical fiber sensor.

Industrial equipment such as mining conveyor belts can be excessively long and contain a large number of rollers or bearings for monitoring. For example, a 20 km long conveyor belt with rollers every half meter would include approximately 40,000 rollers, each with multiple bearings.

Further, it would be desirable to be able to continuously monitor the condition of the belt or other conveyance devices.

SUMMARY OF THE INVENTION

It is an object of the invention, in its preferred form to provide an improved form of monitoring conveyor belt machinery or the like.

In accordance with a first aspect of the present invention, there is provided, a method of monitoring a conveyor belt state, the method comprising the steps of: (a) monitoring the acoustic emissions from a conveyor belt using an optical waveguide interrogator, the optical waveguide interrogator outputting a series of data bins representing the temporal evolution of the acoustic emissions received along the optical waveguide; and (b) utilising the temporal evolution of the acoustic emissions of adjacent data bins to detect anomalies in the conveyor belt state.

In some embodiments, step (a) further includes: determining the temporal evolution of a measure of the power intensity for adjacent data bins to detect anomalies in the conveyor belt state.

In some embodiments, the step (b) further includes: determining edge measures corresponding to movement along the conveyor belt in the temporal evolution of the acoustic emissions of adjacent bins as an anomaly in the conveyor belt state.

A Hough transform or an edge detection kernel can be utilised to determine the edge measures. Preferably, the Hough transform or edge detection kernel is angle sensitive to the velocity component of the conveyor belt. Preferably, a Hanning window is applied to the data bins.

In some embodiments, a frequency filter is applied to the data bins to filter out predetermined frequency ranges.

In accordance with a further aspect of the present invention there is provided a method of determining the state of a moving conveyor belt in a conveyor belt system, the method including the steps of: recording an acoustic signature at a series of spaced apart points adjacent the conveyor belt; plotting the temporal evolution of the recorded acoustic signature for the space apart points; and determining correlations between adjacent space apart points indicative of a malfunction in the moving conveyor belt.

In some embodiments, the acoustic signature is band pass filtered. In some embodiments, the acoustic signature is recorded by means of an optical waveguide placed alongside the conveyor belt, the waveguide being interconnected to an interrogator for recording the acoustic signature.

In some embodiments, both forward and reverse directions of the conveyor belt are monitored.

BRIEF DESCRIPTION OF THE DRAWINGS

Embodiments of the invention will now be described, by way of example only, with reference to the accompanying drawings in which:

FIG. 8 shows an example kernel for S=1, N=5 and θ=45° (left); and S=1, N=7 and θ=30° (right)

DETAILED DESCRIPTION

The preferred embodiments provide for a system and method which, allows for the monitoring of large scale conveyor belts of the like.

For example, an implementation of the Distributed Acoustic Sensing (DAS) conveyor condition monitoring system (CCMS) as described in the aforementioned PCT application is able to detect bearing failure at any idler frame along the length of a conveyor up to about 20 km length.

For example, belt rips on conveyor belts are relatively rare occurrences, however, when they occur, they have the potential to significantly affect production and profitability of operations. The ability of the conveyor belt monitoring technology to collect data for the full length of the optical fiber cable in real-time makes it an ideal sensing technology candidate for the development and implementation of a conveyor belt anomaly monitoring system, for things such as belt rips. Such a system would be capable of detecting a belt rip event and triggering an emergency stop of the conveyor to minimise damage to the conveyor belt infrastructure. The current automated reporting detects and analysis types if bearing wear from acoustic signatures at specific idler frames and reports them to the user via daily reports. The current DAS system is also capable of detecting developing wear patterns well before the point of failure and these are recorded in a "idler wear history" to enable maintenance management and staff to watch wear developing over time and make decisions as to when to schedule idlers for change-out.

Figure 1:
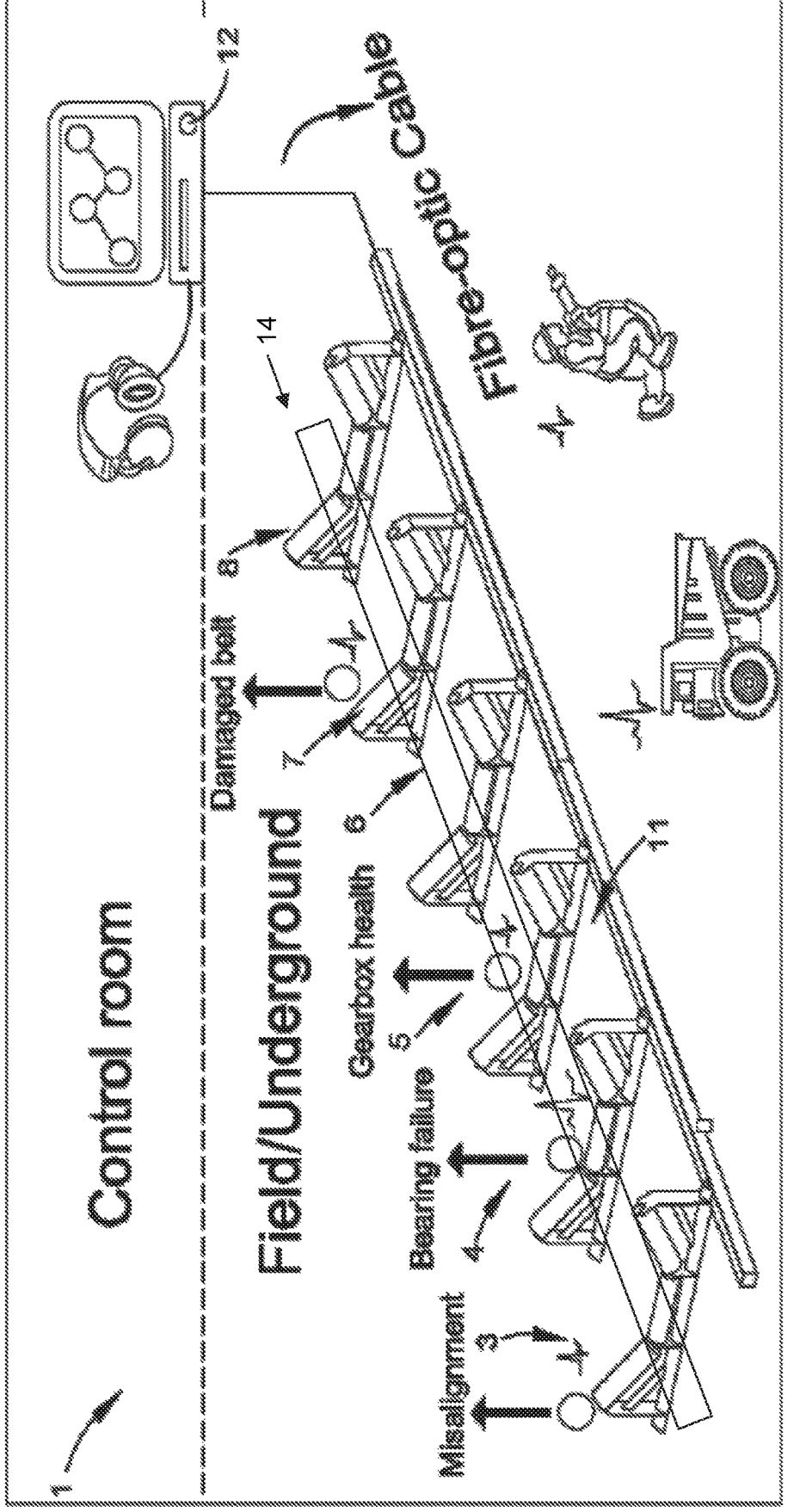
FIG. 1 an example operation of a fiber optic cable monitoring system of the prior art.
Figure 2:
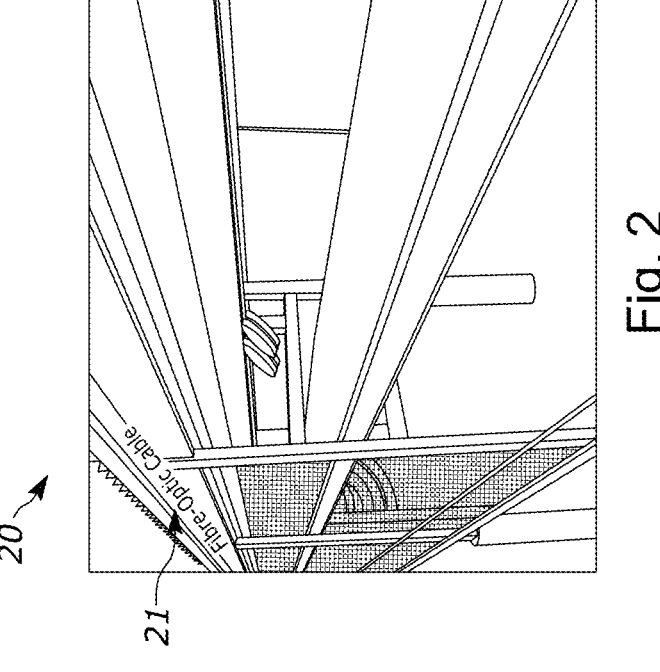
FIG. 2 illustrates a photograph of the installation of a cable arrangement at a conveyor.

The DAS CCMS uses a fibre-optic cable installed along the length of the conveyor belt, as shown in FIG. 1 and FIG. 2.

Figure 3:
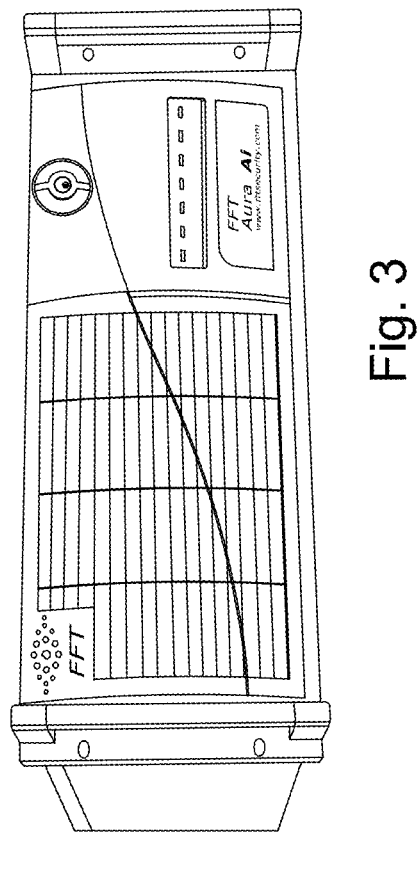
FIG. 3 illustrates an example interrogator processing unit.

FIG. 1 illustrates schematically the sensing system of the aforementioned PCT application. FIG. 2 illustrates a photograph of an example installation of the arrangement along a conveyor belt. FIG. 3 illustrates an example interrogator used for recording data.

The fibre cable is connected to an optical fibre interrogator unit. Whilst the embodiments utilise the Future Fibre Technologies (FFT) Aura IQ interrogator, (as shown in FIG. 3), other interrogator devices can be used.

The interrogator sends out repeated laser pulse and measures the return light. The return light intensity is integrated over a set distance, defined by configuration of the system, which in this embodiment was set to roughly 0.5 meters of data.

This specific length is referred to as a bin, where a single conveyor of e.g. 100 m has 200 bins. Each bin corresponds to a location along the fibre and using installation methods each bin maps to a specific idler and can give the operator information about the rollers in that region.

Figures 4, 5:
FIG. 4 illustrates an example signal obtained from an interrogator unit.
FIG. 5 illustrates the signal of FIG. 4 after clean up processing.

FIG. 4 illustrates a plot of the Fourier transform of the raw input signal captured by an interrogator.

FIG. 5 illustrates a "cleaned up" version of the signal of FIG. 4, having a reduced level of noise. The signal shows the process of half a meter of conveyor belt in operation.

Through analysis of the signal of FIG. 5, features of interest can then be evaluated. The raw signal is processed with DAS algorithms creating a plot where prominent features are highlighted and the signal adjusted so it can be evaluated.

Time Domain Processing

In the embodiments, a per bin temporal recordal of acoustic signatures is undertaken and is compared in order to determine any correlated patterns which could indicate belt damage or the like.

Turning initially to FIG. 1, there is shown schematically the operational environment of an embodiment. In this arrangement 1, the acoustic environment around a belt 14 and a series of rollers e.g. 3-8 is monitored by a single optical fibre cable 11 which is placed alongside the rollers. The optical fibre cable 11 has an optical signal that is modulated by the acoustic sensing environment and is connected to a series of enhanced processing unit or interrogator 12 which process the optical signal to determine a corresponding acoustic signal in the environment adjacent the optical fiber.

In practical systems, a conveyor belt with thousand sets of rollers may be effectively simultaneously monitored using such an arrangement. Through significant processing of the received optical signal, the state of the rollers and their bearings can be determined, in addition to the state of the overall conveyor system.

Examples of optical monitoring systems 12, known as interrogators, include the Future Fibre Technologies FFT Secure Pipe product and the Optasense Pipeline Monitoring system. Also included are acoustic fibre optic interrogators from other manufacturers, such as Fotech, Terra15 and Hawk.

The interrogator unit collects responses from the glass fibre light pulses. The glass fibre contains microscopic imperfections which scatter the light. The imperfections cause "Rayleigh Scattering", the same effect that renders the sky blue. Vibrations and temperature variations in the fibre cause refractive index changes inducing readable signals into the reflected light. High intensity, short pulse lasers are used, coupled with sensitive reflection detectors and fast analogue-to-digital converters.

With these systems, a simple optical fibre cable can be laid along the conveyor belt and affixed near each roller. FIG. 2 illustrates a photograph of one such arrangement 20 wherein a cable 21 was affixed to a conveyor belt infrastructure 22 using cable ties or the like. Alternative fixing arrangements include spring or screw clamps.

The fibre is attached to an interrogator unit 12 from one of the proprietary companies discussed above, and outputs a digital equivalent of the received acoustic signal for storage. The acoustic signal is output in a data format as follows. For the output time period, an acoustic signal for each channel, bin or unit distance along the conveyor, is output for each audio frequency received.

In the embodiments, after noise removal or the like is performed, for example, utilising techniques outlined in the aforementioned PCT application, a plot is determined of the evolution of the time behaviour of each bin.

Various plots can be created, including the spectral energy of a bandpass frequency etc.

Figure 6:
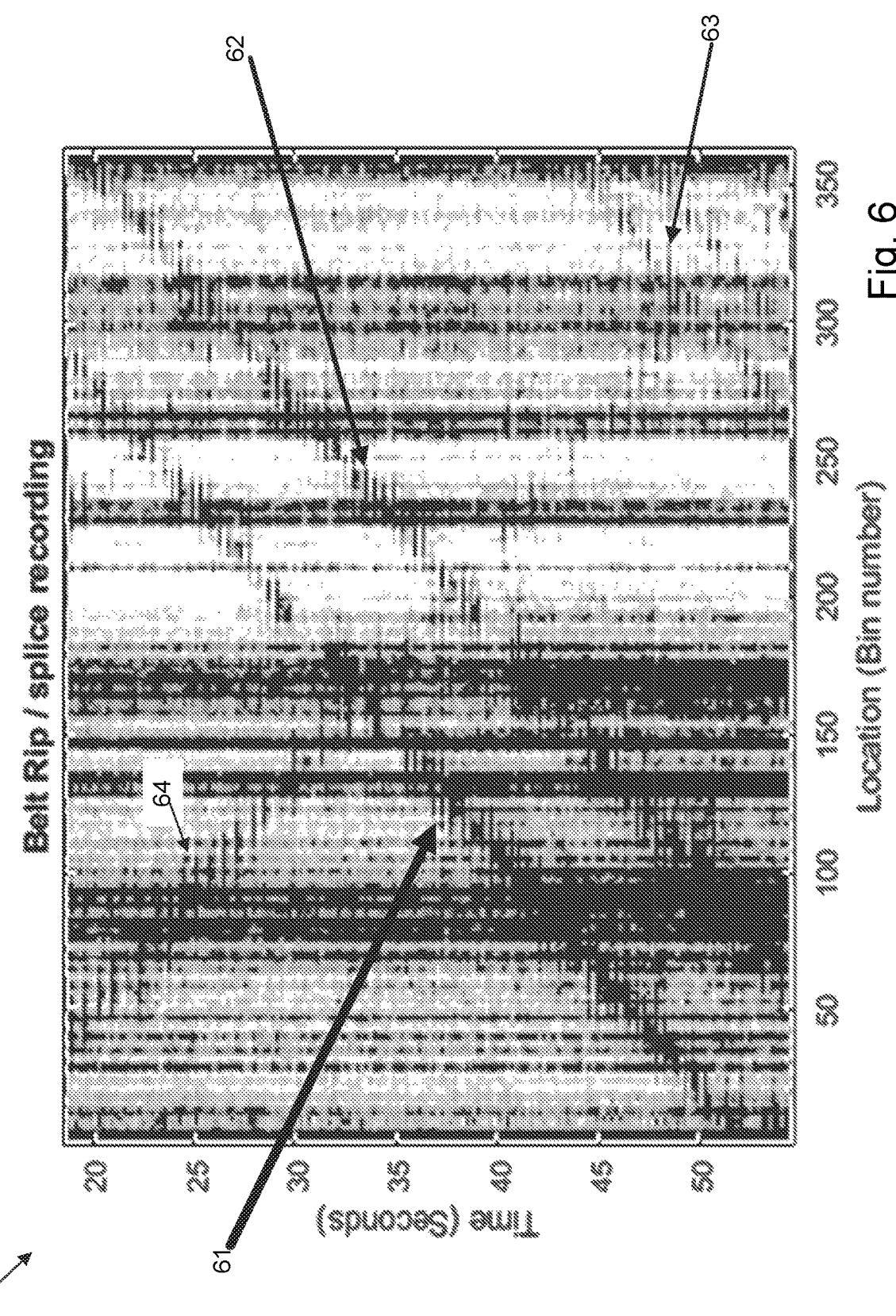
FIG. 6 illustrates an example plot of the time evolution of bin recordals.

FIG. 6 illustrates one form of recorded plot 60, wherein for a series of 360 odd bins, the time evolution of the bandgap spectral energy is shown for over 30 seconds. The plot evidences a conveyor belt where a belt rip had occurred.

A number of features are evident in FIG. 6. These include trace lines 61-64. These trace lines indicate issues with a portion of the conveyor belt, with the lines 61, 62, 63 illustrating an issue with a body in the forward direction, and line 64 being illustrative of a belt issue with the belt moving in the return direction. The lines being indicative of a potential belt rip.

In order to enhance the detection of belt rip issues, a number of image processing techniques can be applied to the intensity plot of FIG. 6.

Additionally, in cases where the approximate speed of the conveyor belt is known, the filters can be customised to detect features that are moving at the same approximate speed.

Figure 7:
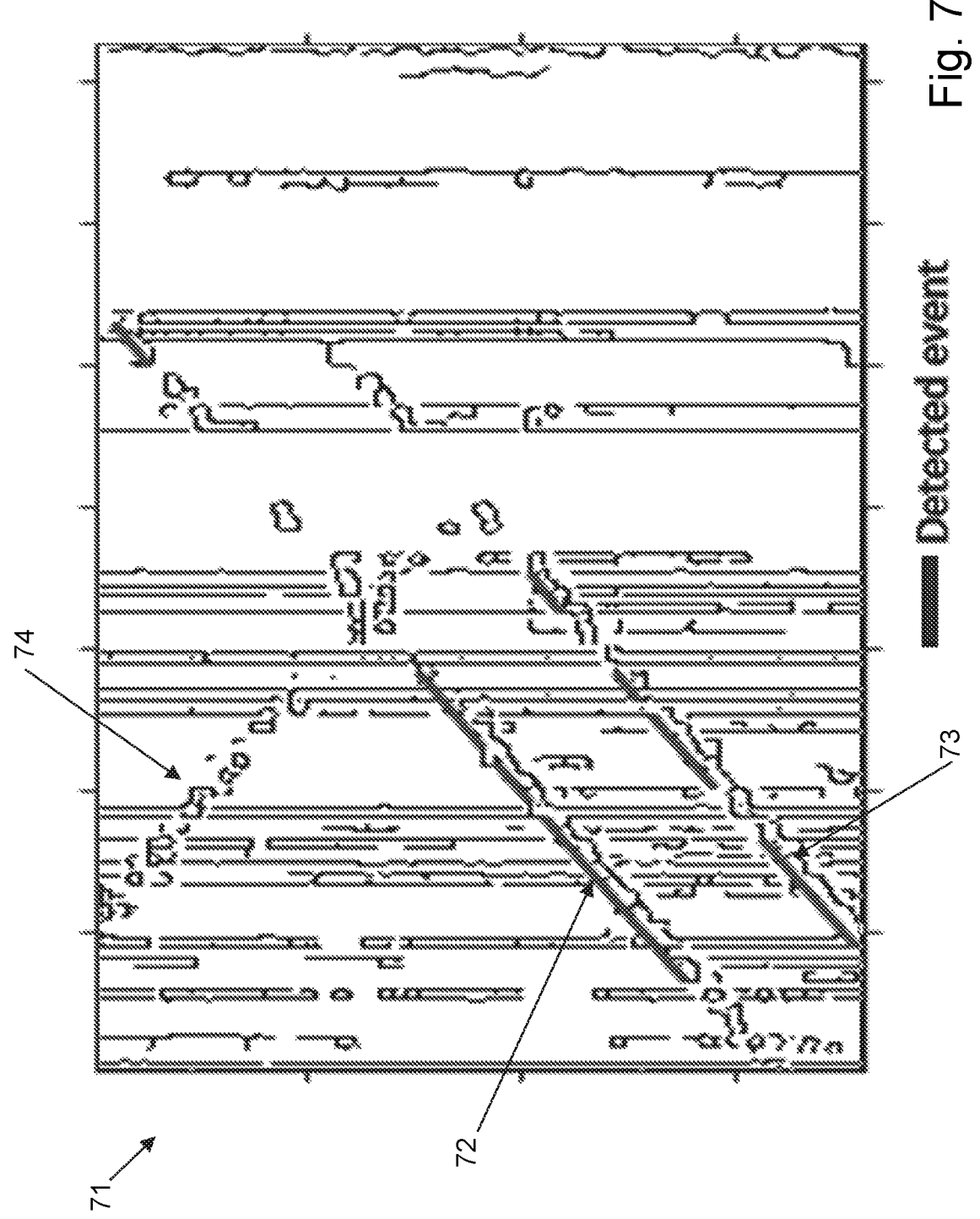
FIG. 7 illustrates an edge filtered version of the arrangement of FIG. 6.

It can be seen from the results of FIG. 6 and FIG. 7, signals potentially belonging to a belt rip event can be recorded. Belt rips on conveyor belts are relatively rare occurrences, however, they have the potential to significantly affect production and profitability of operations. Initial research has determined that these events appear to have a reasonably distinctive acoustic signature. Features of interest remain relatively constant over time, moving along the carry rollers of the conveyor belt frame in a right to left motion and then crossing from left to right as the belt returns in the opposite direction. The plots being derived from a potential belt rip recorded on an active trial site.

Early exploration of these types of acoustic signatures have shown promising results. The data was selected because it potentially contains a belt rip event. The algorithm, used to estimate the rip, also allows for estimation of belt speed, which can be useful to filter out potentially similar events to reduce the effects on the DAS roller monitoring.

The value herein would be faster feedback to the operator, information about rapid changes like belt rips, and other information.

Further Embodiment—Conveyor Belt Condition Monitoring System

The DAS interrogator, the fiber optic cable, and the installation procedure for this embodiment would be similar as for the current Conveyor Condition Monitoring System (CCMS) of the aforementioned PCT application. However, in this instance the data from the interrogator is fed directly to a computational resource such as a GPU or the like.

Once enough acoustic data has been collected (currently set to about 0.2 seconds worth of data at 10,000 Hz Pulse Repetition Frequency (PRF)) for each location along the fiber (bin), it is de-trended and windowed. The algorithm then computes the Fourier-transform for the overlapping time-series vectors for each bin. Then, the average power (of the absolute value of the Fourier transform) is calculated for a particular frequency band for each of these transforms. This average power for each of the overlapping sets of time-series data can be displayed in a matrix (commonly referred to as a waterfall plot), where the x-axis indicates physical location (cable length), the y-axis indicates the timestamp of the time-series block and the darkness level for each cell in this matrix represents the average power. The darker the intensity, the more power is contained in the set frequency band for that particular period in time at a bin.

FIG. 6 illustrates an example of a waterfall plot 60.

The waterfall plot 60 contains information about the power across time and location. A belt rip event is expected to produce an acoustic signature, which could be characterised as an increase in power for a frequency band, across several locations, at a starting point in time and occurring in subsequent time-windows on contiguous bins. A belt rip will look like diagonal lines from left to right (61, 62) or right to left 64 (depending on the direction of the belt) moving at the speed of the belt.

A GPU is programmed to detect these patterns utilising feature extraction algorithms described below. These algorithms are used to detect the straight lines that may exist in in the waterfall plot, which produces in itself a matrix with possible lines detected.

FIG. 7 illustrates 71 one form of post processing of the waterfall plot of FIG. 6, by means of an edge detection filter. The resulting image 71 includes a number of features 72-74 further enhancing the detection of anomalous events. Many other filters can be applied. For example, Sobel filters would also have particular application.

The highest value points along a diagonal line are taken as the possible belt rip indicators. Where the line is offset at an approximate angle that would accord with the speed of conveyor belt travel, either in a forward or reverse direction, the line intensity is determined.

Where they exceed a threshold they are taken to be an indicator of belt damage and an output signal triggers an alarm. Upon alarm activation, the conveyor belt can be stopped in extreme cases. Alternatively, they can be used as a current indicator of belt issues.

This embodiment combines several transforms and methods to determine belt state.

In the aforementioned PCT application PCT/AU2018/050144, there was a system described which, for each bin, computed the Fourier transform for the entire time-series data collected for the bin and averages them arithmetically to reduce noise. Such a system would require modification to detect transient events that may have occurred during the recording time. These events may appear as heavily dampened features (due to the averaging, only the frequency features that remain roughly constant thought out the recording time are realised in full amplitude in the frequency plots) in the frequency plots. The aforementioned PCT application describes a batch processing approach, i.e. the results for each bin are completely independent of other bins.

In the present embodiment, the analyses the waterfall plot data occurs across both time and bins, as it is expected that a belt rip will cause an acoustic signature across several lines.

Frequency Domain Processing

The time-series data or raw data is collected by the DAS interrogator for each bin along the optical fiber cable. Once a certain number of these time-series data has been collected for a bin to be processed is then detrended. This block of data is then windowed using a Hanning window. The Hanning window coefficients can be computed using:

$$w(n) = 1/2(1 - \cos(2\pi n N)); 0 \le n \le N \tag{1}$$

For a window length L=N+1. Contiguous segments of the windowed data are then combined and processed to increase the apparent time resolution however it also increases the computational burden.

The finite Fourier Transform or Discrete Fourier Transform (DFT) is then computed for each of these windows. We can generalise this block of time-series data as a sampled signal x(n)=x(nΔt), with a total number of samples or block size of N. For a sampled signal x(n), the DFT is defined as:

$$X(m\Delta f) = \sum_{n=0}^{N-1} x(n)\exp^{-j2\pi m\Delta f n/N}; m = 0, 1, 2, \ldots, (N-1) \tag{2}$$

The DFT inputs and outputs are complex, with defined N discrete frequency values for N discrete time values and hence, the frequency resolution is given as: $\Delta f=1/(N\ \Delta t)$. Consequently, the Nyquist frequency occurs at m=(N/2) and hence only, the [(N/2)−1] frequency components represent unique values. Considering only the positive frequency components, the estimation of the power spectral density can be achieved via several methods. Ensemble averaging procedure was used, as given in Eq 3:

$$W_{xx}(m\Delta f) = \frac{2}{n_d N \Delta t}\sum_{i=1}^{n_d} |X_i m\Delta f|^2; m = 1, 2, \ldots, \left(\frac{N}{2} - 1\right) \tag{3}$$

The inputs into Equation 3 are in the form of complex DFT outputs from a sampled signal x(n), which has a total duration of $n_d N\ \Delta t$, and that has been divided into contiguous segments, each of duration N Δt. For example, for a signal x(n), sampled at a frequency of 10,000 Hz (1/Δt=10000), a block size of 2000 (N=2000), and a duration of 0.4 seconds, one could expect continuous segments ($n_d$=2). If a 50% overlapping is applied, then the resulting number of segments would increase to 3 complete segments and so on.

The average power is then computed for a particular frequency band. The frequency band can be determined from experience or experiment to be those of interest of belt malfunctions. The average power for a particular frequency band, for a particular bin, for a particular period of time then represents one pixel or cell value in the waterfall matrix.

The waterfall plot is then transformed into a black and white image, to be analysed to detect dark contiguous cells that represent areas of interest. A Hough transform can be used to extract potential features of interest from the waterfall plot. The Hough transform is used to detect straight lines given as:

$$\rho = x\cos(\theta) + y\sin(\theta) \tag{4}$$

Where p is the distance from the origin (in this case set to the left, top corner of the waterfall plot) and the closest point in the straight line, and $\theta$ is the angle between the horizontal (taken as top horizontal line of the waterfall plot) and the line connecting the origin the closest point of the line.

The output from the Hough transform is a matrix with the corresponding to the $\rho$ and $\theta$ values. The elements in this matrix represent accumulator cells. This accumulator retains the highest value for $\rho$ for every non-background point in the image, for every $\theta$ allowable. At the end of this procedure, the highest points in this accumulator matrix represent potential lines in the input waterfall image and hence potential events of interest.

This method allows the implementation of several 'safeguards for accurate detection of potential belt rip events. For instance, a minimum/maximum length can be set to limit possible events to a reasonable timespan. Additionally, the angle $\theta$ can be limited to the angles that would correspond to known or estimated belt speed, greatly aiding in avoiding false positives (for example, vehicles or people walking along conveyor belt).

An alternative embodiment can be implemented using image kernels, sometimes referred to as convolution matrices. A custom kernel may be particularly useful to analyse the waterfall plot. The size of the kernel would be selected in a way to define a minimum feature size to be detected and the kernel coefficients could be dynamically set given the knowledge of the belt speed. The belt rip is represented in the waterfall plot as a diagonal line. As the x-axis in the waterfall plot represents distance and the y-axis time, the angle $\theta$ of the belt rip feature is given by the tangent of the belt speed.

For instance, a square kernel could be defined by selecting an uneven number N and picking a seed-number S. Then S is placed into the centre-cell of the kernel and all other cells can be calculated by equation 5, where i and j are the row and column number of the cell in the matrix and x and y are distances in rows and columns to the centre cell:

$$\text{Cell}_{ij} = S - (S/2)*(x*\cot\theta + y*\tan\theta) \tag{5}$$

FIG. 8 shows some kernel examples for different configurations. A dynamic kernel would then be applied using well known image processing algorithms and as implemented in most image processing libraries like OpenCV (Open Source Computer Vision Library) for GPU devices.

Such a kernel could heavily speed up the processing by optimising the feature extraction step. Both edge detection and selection of suitable features could be achieved in a single step, leaving only features that match the belt speed.

The novel algorithm for belt rip detection described in this section combines several transforms and algorithms to calculate and extract features of interest in the frequency domain, combined with a spatio-temporal characterisation of areas of interest.

The embodiments provide for condition monitoring of the belt, to also allow for real-time belt rip detection alarming system.

Further, additional data analysis could allow for other feature extraction algorithms to build up to robustness and reliability of such alarming system. Strong predictors may be derived from deviation of 'normal' resonant acoustic signatures, which may be used in combination with the features extracted using the algorithms described for the future development of AI systems.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of monitoring a conveyor belt state, the method comprising:

(a) monitoring the acoustic emissions from a conveyor belt using an optical waveguide interrogator, the optical waveguide interrogator outputting a series of data bins representing the temporal evolution of the acoustic emissions received along the optical waveguide; and (b) utilizing the temporal evolution of the acoustic emissions of adjacent data bins to detect anomalies in the conveyor belt state, wherein the utilizing step further comprises using a Hough transform or an edge detection kernel for determining edge measures corresponding to movement along the conveyor belt in the temporal evolution of the acoustic emissions of adjacent bins as an anomaly in the conveyor belt state, and wherein the Hough transform or edge detection kernel is angle sensitive to the velocity component of the conveyor belt.

2. The method as claimed in claim 1, wherein step (a) further includes:

determining the temporal evolution of a measure of the power intensity for adjacent data bins to detect anomalies in the conveyor belt state.

3. The method as claimed in claim 1, further comprising applying a Hanning window to the data bins.

4. The method as claimed in claim 1, further comprising applying a frequency filter to the data bins to filter out predetermined frequency ranges.

5. A method of determining the state of a moving conveyor belt in a conveyor belt system, the method including the steps of:

(a) recording an acoustic signature at a series of spaced apart points adjacent the conveyor belt;

(b) plotting the temporal evolution of the recorded acoustic signature for the space apart points; and (c) determining correlations between adjacent space apart points indicative of a malfunction in the moving conveyor belt, wherein the determining includes determining the state of both forward and return aspects of the moving conveyor belt.

6. The method as claimed in claim 5, wherein said acoustic signature is band pass filtered.

7. The method as claimed in claim 5, wherein said acoustic signature is recorded by means of an optical waveguide placed along side the conveyor belt, the waveguide being interconnected to an interrogator for recording the acoustic signature.

8. The method as claimed in claim 5, wherein at least one enhancement filter is applied to the plot enhancing predetermined directional motion of belt artifacts.

9. A system configured to implement the method of claim 1.

* * * * *